2,054,911

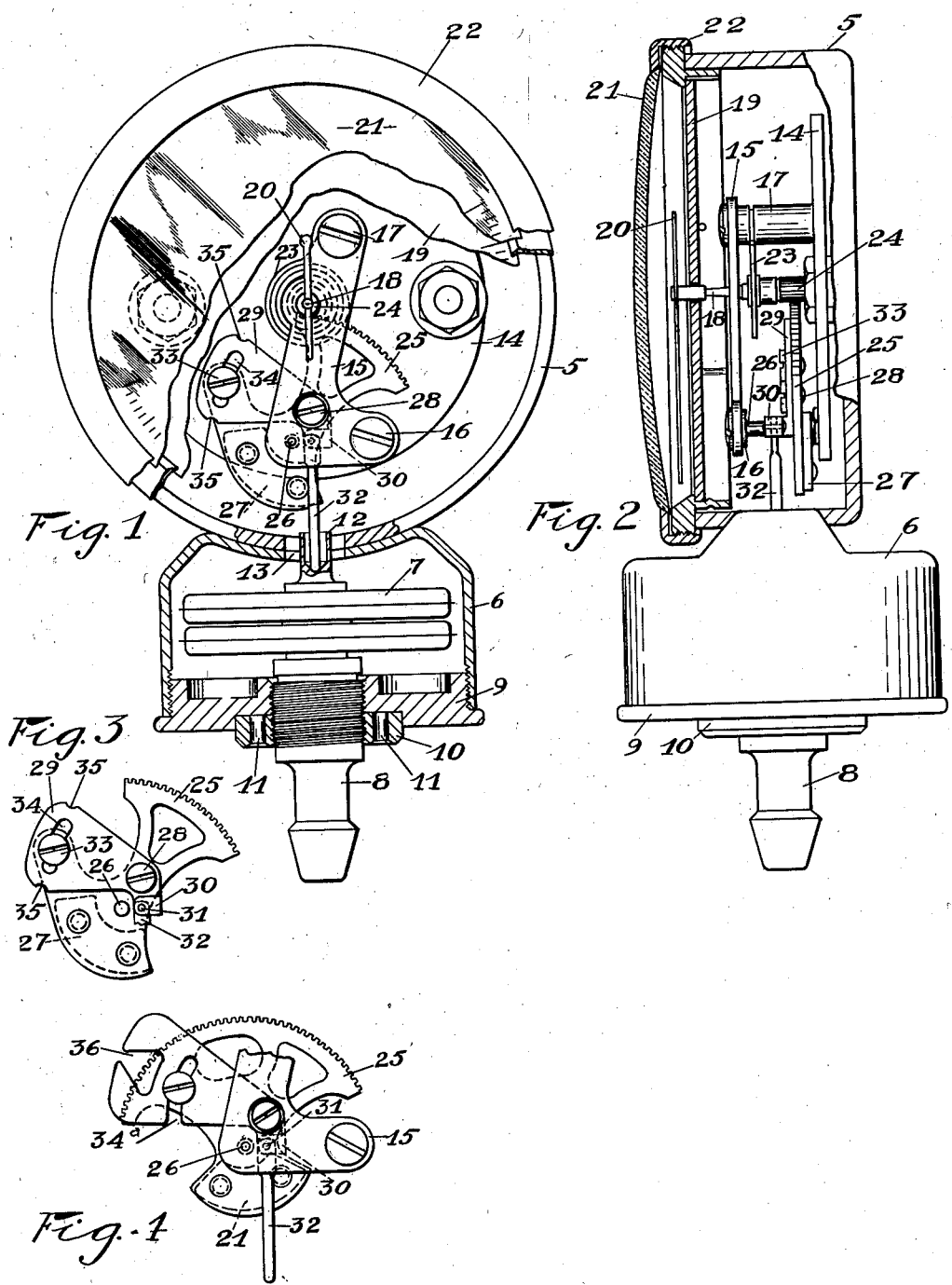
Sept. 22, 1936.    F. B. NEWELL ET AL    2,054,911
PRESSURE GAUGE
Filed Sept. 17, 1935
INVENTORS
Floyd B. Newell and
Henry L. Mason
BY D. Clyde Jones
ATTORNEY Patented Sept. 22, 1936

UNITED STATES PATENT OFFICE 2,054,911

PRESSURE GAUGE

Floyd B. Newell and Henry L. Mason, Rochester, N. Y., assignors to Taylor Instrument Companies, Rochester, N. Y., a corporation of New York Application September 17, 1935, Serial No. 40,876

2 Claims. (Cl. 73—110)

This invention relates to pressure gauges and more particularly to pressure gauges designed for use in sphygmomanometers and other delicate pressure indicating and recording instruments.

Pressure responsive elements or diaphragms employed in such gauges vary in their characteristics one from another, even when manufactured to exact specifications. It therefore becomes necessary to adjust the operating mechanism of each gauge to function accurately with the pressure responsive element or diaphragm with which it cooperates.

In a gauge of the sensitivity required in a sphygmomanometer, it is essential that all the moving parts thereof approach a substantial operating balance so that the readings of the gauge are not appreciably affected by the position in which it is held.

The present invention thereof has for its purpose a gauge or sphygmomanometer of relatively simple construction wherein the several parts approach a substantial operating balance and wherein the parts can be adjusted with micrometric accuracy to the characteristics of its capsular diaphragm.

The various features and advantages of the invention will appear from the detailed description and claims when taken with the drawing in which Fig. 1 is a front view partially in section of a gauge or sphygmomanometer of the present invention; Fig. 2 is a side elevation of this sphygmomanometer with a portion of its case also broken away; Fig. 3 is a plan view of the sector plate and the radius lever with a portion of the push rod broken away; and Fig. 4 is a slightly modified form of operating unit that can be substituted for the unit disclosed in the instrument of Figs. 1 and 2.

Referring especially to Figs. 1 and 2, 5 designates a cup-shaped case, open at its front, to enclose certain of the operating mechanism of the sphygmomanometer or gauge, and 6 designates a housing attached to the side of the case, forming a chamber for the pressure responsive element or capsular diaphragm 7 of the device. This pressure responsive element can be of any well-known construction such as metal bellows, which communicates through a connection nipple 8 to a source of fluid, the pressure of which is to be measured. The nipple is threaded into a plug 9 which is locked by a lock nut 10 having openings 11 to receive a spanner wrench. This plug, in turn, has a threaded connection with the lower end of the housing. The upper or movable end of the metal bellows is provided with a cup-shaped stud 12 which is movable through the opening 13 in the casing and the housing, in response to variations in pressure within the diaphragm.

The mechanism or operating unit of the instrument within the casing, includes a circular bottom plate 14 attached to the rear wall of casing by suitable screws or bolts, while an angular top plate 15 is held in spaced relation to the bottom plate by columns 16 and 17 mounted on the bottom plate. An arbor 18 journaled in these plates, has its upper portion projecting through the top plate and a graduated dial 19, a pointer 20 being attached to the end of the arbor to swing over the dial. A crystal 21 mounted in a suitable bezel 22 closes the front of the case. A coil spring 23 having its ends respectively connected to the column 17 and to the arbor 18 tends to rotate the arbor and its pointer in a counterclockwise direction. On an intermediate portion of the arbor there is secured a pinion 24 adapted to be rotated by a rotatable sector plate 25 which is provided on a portion of its periphery with gear teeth to mesh with the pinion. This sector plate, which is secured to a staff 26 mounted in suitable bearings in the top and bottom plates, is provided on the portion thereof opposite the gear teeth with a counterweight 27 to balance the same. On the sector plate there is mounted on axis 28 for rotary adjustment, an adjustable radius lever 29. This radius lever at one side of its axis or pivot 28 is formed with a struck-up ear 30 to carry a pin 31, which passes through a cross aperture in the upper end of a push rod 32 to provide a pivotal mounting therefor. The lower end of this push rod normally engages the cup-shaped recess on the end of the stud 12. The other end of the radius lever can be clamped in any adjusted position with respect to the sector plate by a set screw 33 passing through a slot 34 in the radius lever and threaded into the sector plate 25. It will be appreciated that as the radius lever 29 is rotated about its pivot 28 to vary the position of the screw 33 in the slot 34, as well as the position of the ear 30 with the push rod 32 pivotally mounted thereon, radius 26—31 is varied, thus changing the angular velocity of pointer 20 to adjust for the particular elastic characteristics of this diaphragm. Thus by varying this relation, the operating unit of the sphygmomanometer can be adjusted to operate accurately with respect to the characteristics of its own diaphragm. It will be noted that the radius lever at each side of the clamping screw is provided with notches 35 so that an adjusting tool (not shown), such as a pair of dividers having one leg engaging a notch in the radius lever and the other leg engaging the side of the clamping screw, can adjust this lever with respect to the sector plate by small increments of movement of micrometer proportions.

It should be noted that the center of mass of the radius lever is located at that side of the pivot 26 which is opposite the ear 30 and its pivotally connected push rod 32. By this arrangement the operating mechanism approaches a substantial balance, even when the spring weight of the capsular diaphragm 7 and its lug 12 are taken into consideration. This balance is not substantially disturbed by any normal adjustment of the radius lever 29.

In the operation of the device when the pressure in the diaphragm 7 increases, this diaphragm expands and the cup-shaped lug on its exposed face forces the push rod 32 upward. This movement of the push rod causes the radius lever 29 and the sector plate 25 to which it is fastened, to rotate in a counterclockwise direction about pivot 26. The gear teeth on the periphery of the sector plate engage the pinion 24 and rotate it, as well as the arbor 18 with its pointer 20, in a clockwise direction. When the pressure in the diaphragm 7 is reduced, this diaphragm contracts and the stud 12 therein withdraws into the opening 13. The spring 23 which is attached to the column 17 and to the arbor 18, rotates this arbor with the pinion 24 and the pointer 20 carried thereby, in a counterclockwise direction. This causes the sector plate and the radius lever carried thereby to rotate in a clockwise direction, maintaining the free end of the push rod 32 in engagement with the stud 12.

In the modified form of the invention illustrated in Fig. 4, the gear portion of the sector plate 25' includes a larger arc than the sector plate of Figs. 1 and 2. By this construction a portion of the sector plate is in superimposed relation with respect to a portion of the radius lever 29'. The end of the radius lever has a delta-shaped opening 36 therein, exposing a portion of the teeth on the sector plate. Thus by inserting a knife-edged tool through the entrance to the delta-shaped opening, with the edge of the tool engaging the lever at the entrance of this opening therein, the radius lever can be pried in a rotary direction with respect to the sector plate. The slot 34a in the radius lever which receives the clamping screw is open at one side, but its function is the same as the corresponding slot shown in the arrangement of Figs. 1, 2 and 3. The operation of this unit is the same as that described in connection with the foregoing modification.

We claim:

1. In a gauge or the like, a substantially balanced rotatable sector plate having gear teeth provided on a portion thereof, a rotatable indicating element having a pinion engaging said teeth, a lever mounted for rotary adjustment on said plate whereby the angular velocity of said element can be changed, a push rod pivoted on said lever and extending generally in the plane of said sector plate, the axis of rotation of said sector plate being located generally between the center of mass of the radius lever and the pivot of said rod.

2. In a gauge or the like, a substantially balanced rotatable sector plate having gear teeth provided on a portion thereof, an indicating element having a pinion meshing with said teeth, a lever pivotally mounted for rotary adjustment on said plate, said lever having a long arm and a short arm, a push rod pivoted on the short arm of said lever and extending generally in the plane of said sector plate, the axis of rotation of said sector plate being located generally between the center mass of the lever and the pivot of said rod.

FLOYD B. NEWELL.
HENRY L. MASON.